G. L. ACKEMAN.
Carriage-Wheel.
No. 4,001. Patented Apr. 16, 1845.
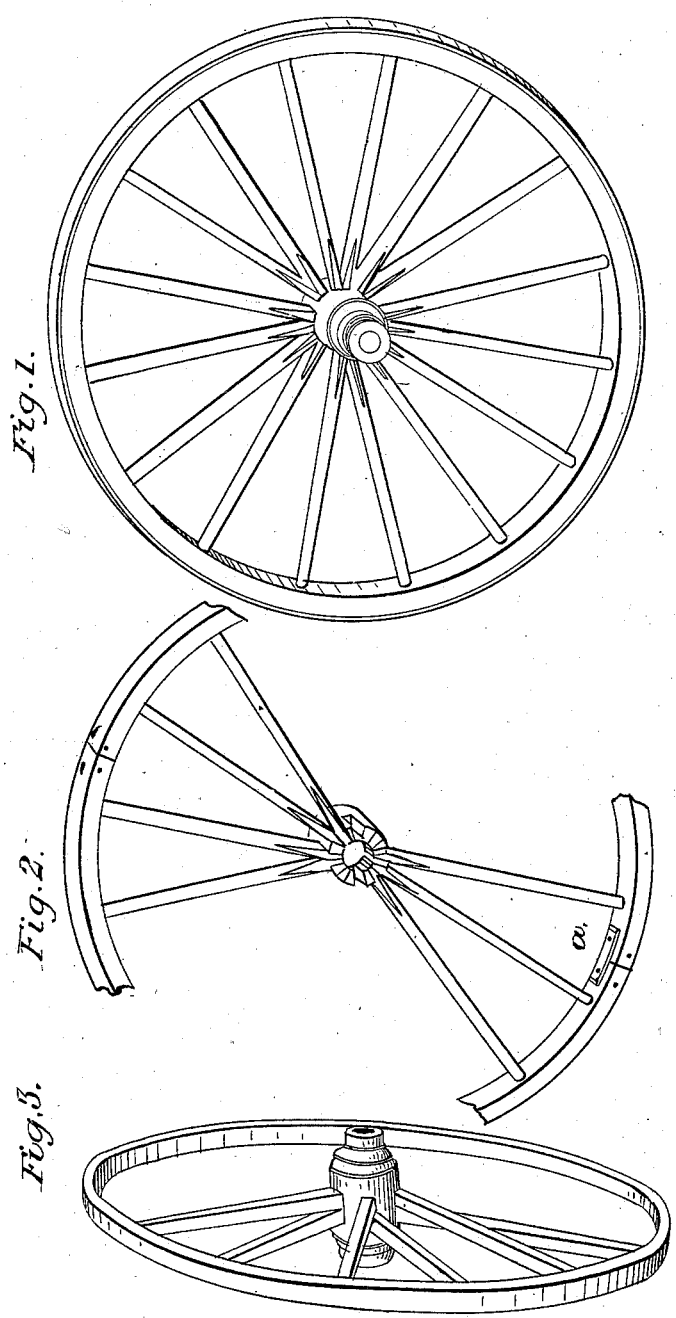

UNITED STATES PATENT OFFICE.

GERSHOM L. ACKERMAN, OF TROY, NEW YORK.

CARRIAGE-WHEEL.

Specification of Letters Patent No. 4,001, dated April 16, 1845; Antedated October 16, 1844.

*To all whom it may concern:*

Be it known that I, GERSHOM L. ACKERMAN, of the city of Troy, in the county of Rensselaer and State of New York, have invented new and useful Improvements in Wagon and Carriage Wheels; and I do hereby declare that the following is a full and exact description, reference being had to the annexed drawings, making part of this specification.

My principal improvement consists in providing two spokes to each mortise in the hubs of the wheel, as represented in Figures 1 and 2 of the annexed drawings. The sides of the mortises which are parallel to the length of the hub being from the circumference to the opening for the axletree in the center, in the direction of the radii of its circle, or nearly so—the corresponding surfaces of the tenons of the spokes being fitted thereto—and on the inside the tenons of the two spokes in the mortise are beveled so as to come in contact with each other on a like radial line to the extent of the depth of the mortise, as shown in the representation of a broken hub in Fig. 2. By these provisions an oblique surface is presented to the bearing of each spoke—the side of the mortise on one side and the beveled surface of the tenon of the spoke in connection on the other. By this improvement a considerable portion of the wood of the hub and of its strength of course is preserved and not cut away, as it is in the common mode of making a separate mortise for each spoke and in the direction of its length. By means of this improvement also I am enabled to sustain the fellies whether long or short by an increased number of spokes and in other respects as is believed obtain a stronger and firmer hub and wheel than is effected in the common way.

At *a*, Fig. 2, is a plate of iron of discretionary width and thickness with a spike branch at each end which serves as a tie to the adjoining ends of the fellies of the wheel whenever it is deemed expedient. I apply them after the tire is on, first giving a small bend to the end of each branch in order to have them clamp upon the outer surface of the fellies on being driven against the tire. To these I add two or more intermediate screws and a screw or unit transversely through the sides of the fellies near the end as a guard against their being split by this operation or by use afterward.

A different modification of the same principle as that of the above improvement is represented in Fig. 3, where two spokes are shown as placed edge to edge in one mortise. In this case the mortises are made more or less tapering at discretion as extended from the circumference to the opening in the center of the hub and an angular form is given to the tenon of the spokes according to the outward divergency of the two spokes from each other so as to fit the mortise. This gives an oblique bearing to each against the side of the mortise opposite to the other. I adopt this form of construction or not, at my option—applying it when I do principally to wheels made for heavy burdens or for the preservation of roads by means of broad fellies and tires—or two rims of fellies united as one for like purposes by tires covering both or by any other mode of fastening—or if applied to wheels of ordinary width of felly or tire the spokes are bent inwardly, as shown in Fig. 3, to the line of their circumference.

What I claim and desire to secure by Letters Patent is—

The construction and use of wheels with two spokes in one mortise, in the manner and for the purposes above described.

G. L. ACKERMAN.

Witnesses:
S. S. HUNT,
DANIEL WHITING.